United States Patent Office 3,709,795
Patented Jan. 9, 1973

3,709,795
PURIFICATION OF CARBOXYLIC ACIDS BY CHEMICAL TREATMENT AND DISTILLATION
Thomas C. Singleton, Texas City, Tex., assignor to Monsanto Company, St. Louis, Mo.
No Drawing. Filed Feb. 2, 1970, Ser. No. 8,079
Int. Cl. B01d *3/34;* C07c *53/08*
U.S. Cl. 203—31                                    10 Claims

ABSTRACT OF THE DISCLOSURE

A process for the removal of halide impurities from carboxylic acids, said process comprising contacting a carboxylic acid containing halide impurities with a treating agent comprising an inorganic oxidizing agent, subjecting the treated carboxylic acid stream to distillation to remove an overhead and a bottoms product, said overhead product containing said carboxylic acid substantially purified of said halide impurities.

BACKGROUND OF THE INVENTION

The present invention relates to the purification of carboxylic acids. More particularly, the present invention relates to the purification of carboxylic acids contaminated with minor amounts of halides.

Recently, it has been proposed to produce carboxylic acids, particularly acetic acid, by the reaction of carbon monoxide and an alcohol, i.e., methanol, or an olefin, i.e. ethylene, in liquid phase with a catalyst system containing a noble metal, i.e., rhodium, iridium, platinum, palladium, ruthenium, osmium, component and a halogen component in which the halide is either bromine or iodine, at least a portion of such halide being present as an alkyl halide such as alkyl iodide or alkyl bromide and as the halide, i.e., iodine or bromine. The product of such reaction generally contains minor amounts of the halides of the catalyst system. While the majority of such halides may be readily removed by conventional means such as distillation, it has been found that the last traces, usually in parts per billion of halide, cannot be readily and economically removed by conventional techniques. However, since such traces are sufficient to cause difficulty in many subsequent applications of the product produced by the reaction, there is a necessity for removing these traces of halide. Therefore, there is a need for additional means for removing these last traces of halide impurity from the product carboxylic acid.

It is an object of the present invention to provide a method for purifying carboxylic acids of trace amounts of halide contained therein.

Another object of the present invention is to provide a process for substantially removing the last traces of halides from carboxylic acids produced by the reaction of an alcohol or olefin with carbon monoxide in the presence of a catalyst system containing a noble metal component and a halogen component.

A specific object of the present invention is to provide a process for substantially removing the last traces of halide from carboxylic acid produced by the reaction of an alcohol or olefin and carbon monoxide in the presence of a catalyst system containing a metal component selected from the group consisting of rhodium, iridium, palladium, platinum, osmium, or ruthenium and a halogen component of which at least a part is present as an alkyl bromide, alkyl iodide, bromine or iodine.

Additional objects will become apparent from the following description of the invention herein disclosed.

SUMMARY OF THE INVENTION

The present invention, which fulfills these and other objects, is a process for the removal of halide impurities from carboxylic acids, said process comprising contacting a carboxylic acid containing halide impurities with a treating agent comprising an inorganic oxidizing agent, subjecting the treated carboxylic acid stream to distillation to remove an overhead and a bottoms product, said overhead product containing said carboxylic acid substantially purified of said halide impurities.

Through the process of the present invention, trace amounts, i.e., less than 100 parts per billion, of halide impurity in carboxylic acid streams may be substantially removed. Such removal is affected with very little or no loss of product acid and at a cost significantly lower than that by conventional distillation alone.

DESCRIPTION OF THE PREFERRED EMBODIMENTS OF THE PRESENT INVENTION

The treating agents of the present invention are inorganic oxidizing compounds. Generally, these oxidizing compounds contain a metal selected from the group consisting of the alkali metals and the metals of Group VII-B of the Periodic Table. Among such compounds are the following non-limiting examples; potassium permanganate, potassium dichromate, sodium dichromate, chromium potassium oxalate, potassium chlorochromate, potassium chlorate, potassium chromate, chromium trioxide, and the like. Particularly useful compounds for treating agents are such compounds as potassium permanganate, sodium permanganate, potassium dichromate, sodium dichromate and chromium trioxide. The preferred treating agents are potassium and sodium permanganate.

The amount of treating agent employed may vary depending upon the amount of halide to be removed from the carboxylic acid product stream. For removal of halides present in the acid stream in quantities of less than 500 parts per billion, which represents the most useful application of the present invention, the amount of treating agent employed generally will be within the range of 0.00001 to 1.0% by weight of the carboxylic acid stream being treated. Preferably, however, the amount of treating agent employed will be within the range of 0.0001 to 0.01% by weight of the stream being treated.

The treating of the carboxylic acid product stream with the treating agents of the present invention may be carried out in virtually any manner though good mixing of the treating agents and the product stream is desirable. Such mixing may be obtained by refluxing, co-current, countercurrent or cross-current contacting, simple stirring, circulation of the materials, introduction of inert gases, boiling, and like means. Generally, the mixing of the treating agent and the product stream is carried out at temperatures within the range of 16 to 200° C., preferably 20 to 160° C. With the preferred potassium permanganate, temperatures of 20 to 150° C. are most often employed. The pressure within the mixing or treating zone may be subatmospheric, atmospheric or superatmospheric and most often is within the range of 100 mm. Hg to 110 p.s.i.g., preferably approximately atmospheric to 60 p.s.i.g. The temperature and pressure conditions are preferably adjusted such as to permit refluxing of the acid within the treating zone. Generally, the product stream being treated is maintained under the foregoing treating conditions for up to 10 hours or more though seldom will more than 2 hours be used. As a practical matter and under efficient contacting conditions of acid and treating agent seldom will more than a few seconds, i.e., 10 seconds to a few minutes, i.e. 10 minutes, be employed.

Treatment and recovery of the acid stream with the treating agent may be carried out in two stages or in many instances, in a single stage and may be carried out batchwise or as a continuous or semi-continuous operation. If carried out in two stages, the first stage comprises the treating as defined above and the second stage comprises distillation of the treated product of the first stage. The distillation may be carried out in a distillation system of practically any efficiency though it generally is unnecessary to employ more than a five theoretical plate efficiency. The distillation column may be in many instances merely an open tubular column of no more than 2 theoretical plate efficiency or it may be one containing sieve trays, bubble caps, a series of baffles, or packing. This distillation system is operated in a manner such as to vaporize the carboxylic acid overhead leaving as a bottoms product heavy ends and other heavy waste materials. Of course, the temperatures and pressures of operation of the distillation system will vary depending upon the particular carboxylic acid being treated and the determination of such conditions are well within the ability of those skilled in the art in view of the teachings herein.

If the treating and recovery of the acid is combined into a single stage, the halide contaminated acid is introduced into a distillation system concurrently with the treating agent either in a premixed mixture or by means of separate entry lines. The resulting mixture is subjected to distillation to remove the purified acid overhead. In such combination of the treating and recovery steps, it is somewhat preferred that a more efficient distillation system be utilized. Such greater efficiency may be obtained by more plates, higher reflux ratio, lower throughput or other conventional means of increasing efficiency. The purpose of the greater efficiency is primarily to permit a longer contact period of treating agent with the acid. This type of treating combining the treating step with the distillation step may be carried out continuously or batchwise.

The process of the present invention may be applied to any carboxylic acid streams containing halides as impurities. However, the streams to which the process of the present invention is particularly applicable are the carboxylic acid product streams obtained from the reaction of carbon monoxide with an alcohol or olefin in the presence of a catalyst system containing a noble metal component such as rhodium, iridium, platinum, palladium, osmium, and ruthenium, or an iron group metal component such as cobalt, iron, or nickel, and a halogen component such as methyl iodide and/or iodine. Such carboxylic acids include those from 1 to 20 carbon atoms and higher and includes the dicarboxylic as well as the monocarboxylic acids. Also, aryl acids of up to 20 carbon atoms and higher may be treated in accordance with the present invention.

While the present invention may be applied to carboxylic acid streams containing large amounts of halogen impurities such as iodides or bromide, it is most useful in purifying such streams containing less than 500 parts per billion of the halide contaminants. The present invention is most useful in treating streams containing less than 100 parts per billion halide contaminant.

The halide contaminants removed by the process of the present invention include the inorganic and organic halides as well as the molecular halogen. In the most useful application of the present invention, the halides removed are the bromides and iodides, particularly the iodides.

To further describe the preferred embodiments of the process of the present invention, the following examples are presented.

Example 1

To approximately 21 grams of acetic acid containing 130 parts per billion of iodine as methyl iodide and ionic iodide, was added $3.2 \times 10^{-4}$ grams potassium permanganate. The resulting mixture was brought to refluxing conditions and maintained under such conditions for one hour. After such hour, the mixture was placed in a flash distillation unit of approximately one theoretical plate efficiency and the acetic acid distilled overhead. The product acetic acid was found to contain 2.7 parts per billion of the methyl iodide and to be free of ionic iodine.

Example 2

To two 50 ml. flasks equipped with a stillhead and a straight glass condenser were added 20 ml. portions of acetic acid containing 23 parts per billion methyl iodide. By conventional means, radioactivity was imparted to the iodide in the acetic acid. To one of the 50 ml. flasks was added 0.2 ml. of a 0.01 molar potassium permanganate solution in 99% acetic acid. The acetic acid in each flask was obtained from the reaction of methanol and carbon monoxide in the presence of a catalyst system containing a rhodium complex and methyl iodide. The two flasks were brought to distillation conditions and the acetic acid distilled overhead. By measuring the radioactivity of the product acetic acid, it was found that 92% of the radioactive iodine had been removed from the flask to which the potassium permanganate had been added while only 12% of the radioactive iodine was removed from the other flask.

Example 3

To each of two one-liter flasks equipped with a stillhead and reflux condenser was charged 500 ml. of acetic acid containing 100 parts per billion of methyl iodide which had been made radioactive by conventional techniques to facilitate tracing and analysis. To one of the flasks was added 0.5 ml. of a one-molar aqueous solution of potassium permanganate. The contents of the two flasks were brought to reflux conditions. The reflux condensers were operated as partial condensers and controlled such as to permit approximately 4 to 7% of the acetic acid to pass through the condenser as a vapor, the remainder being condensed in the condenser and collected. By measuring the radioactivity of the non-condensed fraction, the condensate and the residue within the flask, it was found that 98% of the iodine initially present in the acetic acid was concentrated in the residue of the flask to which the potassium permanganate had been added. In the same manner, the residue of the other flask was found to contain only 0.6% of the iodine originally present with the majority of the radioactive iodine of this distillation being found in the non-condensed fraction.

Example 4

A one-inch Oldershaw distillation column having 65 trays and equipped with stillpot and reflux condenser was provided with two separate entrance lines opening into the column just above the 15th and 55th trays from the bottom of the column. Liquid acetic acid prepared by the reaction of methanol and carbon monoxide in the presence of a catalyst system comprising a rhodium carbonyl iodide complex and methyl iodide was continuously introduced into the column through the lower entrance line at a rate of 13 mls. per minute. The column was operated under conditions to distill 99% by volume of the acetic acid overhead at a reflux ratio of 2.5:1. Over a 16-hour period of operation, analysis of the overhead product showed the presence of 106 to 116 parts per billion methyl iodide in the acetic acid.

After the above 16 hour period, continuous introduction of a 0.04 molar solution of potassium permanganate in 96% acetic acid was begun through the upper entrance line. The rate of introduction of the potassium permanganate solution was 14 mls. per hour with the other operation of the column being unchanged. Analysis of the overhead product acetic acid showed it to contain as low as 25 parts per billion methyl iodide.

Example 5

Example 2 is repeated except that a $K_2Cr_2O_7$ solution is used instead of the potassium permanganate solution. The $K_2Cr_2O_7$ solution is a 0.01 molar $K_2Cr_2O_7$ solution prepared by mixing about 1% of approximately one molar aqueous $K_2Cr_2O_7$ with about 99% by volume acetic acid. The amount of iodine detected in the product acetic acid is substantially reduced.

What is claimed is:

1. A process for the removal of minor amounts of halide impurities from carboxylic acids, said process comprising contacting said carboxylic acid containing halide impurities with a treating agent comprising an inorganic oxidizing compound and subjecting the treated carboxylic acid to distillation to recover an overhead product and a bottoms product, said overhead product containing said carboxylic acid substantially purified of said halide impurities.

2. The process of claim 1 wherein said inorganic oxidizing compound is one containing at least one metal selected from the group consisting of the alkali metals and the metals of Group VII-B of the periodic tables.

3. The process of claim 1 wherein said treating agent is selected from the group consisting of potassium permanganate, sodium permanganate, potassium dichromate, sodium dichromate, chromium trioxide, chromium potassium oxalate, potassium chlorochromate, potassium chlorate and potassium chromate.

4. The process of claim 1 wherein said carboxylic acid and said treating agent are contacted at a temperature within the range of 16 to 200° C.

5. The process of claim 3 wherein said carboxylic acid and potassium permanganate are contacted at a temperature within the range of 20 to 150° C.

6. The process of claim 1 wherein the contacting of said carboxylic acid and said treating agent is carried out concurrently with distillation of said carboxylic acid.

7. The process of claim 1 wherein the amount of said halide impurities in said carboxylic acid is less than 500 parts per billion.

8. The process of claim 1 wherein said carboxylic acid is acetic acid.

9. The process of claim 1 wherein the amount of said treating agent employed is within the range of 0.00001 to 1.0% by weight of said carboxylic acid.

10. The process of claim 1 wherein said halide impurities are selected from iodide impurities and bromide impurities.

References Cited
UNITED STATES PATENTS

| | | | |
|---|---|---|---|
| 209,978 | 8/1878 | Pirz | 203—31 |
| 2,149,765 | 3/1939 | Goos et al. | 203—31 |
| 2,255,421 | 9/1941 | Groll et al. | 203—31 |
| 2,710,879 | 6/1955 | Snyder | 260—541 |
| 2,893,923 | 7/1959 | Luke et al. | 203—31 |
| 3,084,109 | 4/1963 | Ure et al. | 203—33 |
| 3,214,347 | 10/1965 | Grekel et al. | 203—31 |
| 3,459,707 | 8/1969 | Hayden et al. | 260—541 |
| 3,490,997 | 1/1970 | Burney et al. | 203—33 |
| 3,530,043 | 9/1970 | Horn et al. | 260—541 X |

OTHER REFERENCES

J. A. Babor: Basic College Chemistry, 2nd ed., 1953, Crowell Co., N.Y., pp. 220–223.

WILBUR L. BASCOMB, JR., Primary Examiner

U.S. Cl. X.R.

203—33; 260—541